(12) United States Patent
Subramaniam et al.

(10) Patent No.: US 8,983,909 B2
(45) Date of Patent: Mar. 17, 2015

(54) INFORMATION MANAGEMENT ASSISTANT

(75) Inventors: Kalambur Subramaniam, Karnataka (IN); Ervin Adrovic, Holzgerlingen (DE); Albrecht Schroth, Herrenberg (DE); Bhasin Gautam, Bangalore (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 65 days.

(21) Appl. No.: 13/578,903

(22) PCT Filed: May 4, 2010

(86) PCT No.: PCT/US2010/033509
§ 371 (c)(1),
(2), (4) Date: Aug. 14, 2012

(87) PCT Pub. No.: WO2011/139270
PCT Pub. Date: Nov. 10, 2011

(65) Prior Publication Data
US 2012/0310995 A1 Dec. 6, 2012

(51) Int. Cl.
G06F 7/00 (2006.01)
G06F 17/00 (2006.01)
G06F 9/54 (2006.01)
G06F 17/30 (2006.01)

(52) U.S. Cl.
CPC .......... *G06F 9/541* (2013.01); *G06F 17/30557* (2013.01)
USPC .......................................... 707/636; 707/665

(58) Field of Classification Search
CPC ................................ G06F 17/30221
USPC .......................... 707/665, 668, 670, 669, 636
See application file for complete search history.

(56) References Cited

U.S. PATENT DOCUMENTS

| 7,330,997 | B1 * | 2/2008 | Odom .......................... 714/6.23 |
| 7,606,844 | B2 * | 10/2009 | Kottomtharayil ..................... 1/1 |
| 2003/0097441 | A1 | 5/2003 | Konomi |
| 2005/0015641 | A1 * | 1/2005 | Alur et al. ......................... 714/2 |
| 2006/0053262 | A1 * | 3/2006 | Prahlad et al. ................ 711/162 |
| 2006/0056385 | A1 | 3/2006 | Fotta et al. |
| 2006/0230113 | A1 | 10/2006 | Lundberg et al. |
| 2007/0136200 | A1 * | 6/2007 | Frank et al. ..................... 705/50 |
| 2007/0203957 | A1 * | 8/2007 | Desai et al. .................. 707/204 |
| 2007/0283017 | A1 * | 12/2007 | Anand et al. ................. 709/226 |
| 2008/0052331 | A1 * | 2/2008 | Ogawa et al. ................ 707/205 |
| 2008/0115071 | A1 * | 5/2008 | Fair .............................. 715/764 |
| 2009/0041230 | A1 * | 2/2009 | Williams ...................... 380/28 |
| 2010/0250549 | A1 * | 9/2010 | Muller et al. ................ 707/741 |

OTHER PUBLICATIONS

PCT; "Notification of Transmittal of the International Search Report and the Written Opinion of the International Searching Authority, or the Declaration": cited in PCT/US2010/033509; mailed Jan. 27, 2011; 9 pages.

* cited by examiner

*Primary Examiner* — James E Richardson
(74) *Attorney, Agent, or Firm* — Hewlett-Packard Patent Department

(57) ABSTRACT

Systems, methods, and other embodiments associated with information management are described. One example method includes controlling a computerized process to discover an information management client and one or more information management entities associated with the information management client. The example method may also include determining a data movement plan and executing the data movement plan.

22 Claims, 4 Drawing Sheets

INFORMATION MANAGEMENT ASSISTANT

CROSS-REFERENCE TO RELATED APPLICATION

This application is a national stage application under 35 U.S.C. §371 of PCT/US2010/033509, filed May 4, 2010.

BACKGROUND

Information management in an organization may involve a large number of clients running many different applications. Also, the organization may wish to specify that different types of data from the various clients should be routed to different destinations. The organization also may wish to specify that different types of data must have different transformations performed on them. With the possibility of numerous data sources, data destinations, and data transformations, information management in the organization can be a complex problem. Further, each data source and data destination within the organization may define its own data format or data operations. Thus, each application in the organization may use a specialized agent to link the application to the organization's information management hierarchy. Installing specialized agents on each client running a particular application adds further complexity to the problem of information management. Some organizations may wish to monitor the ongoing success and efficiency of information management tasks. Monitoring information management tasks adds yet another layer of complexity to the problem of information management in the organization.

BRIEF DESCRIPTION OF THE DRAWINGS

The accompanying drawings, which are incorporated in and constitute a part of the specification, illustrate various example systems, methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

DETAILED DESCRIPTION

Systems, methods, and other embodiments that automate and reduce complexity of information management are described. Organizations use a variety of systems that produce information. Managing the information produced by an organization's systems is often an important part of the organization's operations. Examples of an organization's systems include e-mail servers, relational databases, web servers, and computers used by individuals within the organization. Many organizations wish to maintain archives of information produced by the organizations' systems. Archival of systems information permits retrieval in the event of a systems failure, as well as later analysis of the systems information. Similarly, an organization may wish to encrypt information before it is stored or to share information between systems. These tasks are part of the organization's information management.

Generally, a system defines its own data formats and methods for retrieval or transformation of the data stored by the system. Therefore, integration of multiple disparate systems into the organization's information management hierarchy can involve significant work by a systems administrator. The systems administrator is responsible for an element of the information management hierarchy being able to communicate with the other elements of the hierarchy. Further, the systems administrator often is tasked with monitoring information management tasks to ensure that the tasks run correctly and to completion. Due to the complexity of integrating various systems into the organization's information management hierarchy, systems and methods to automate and reduce complexity of information management processes can improve information management within the organization.

Figure 1:
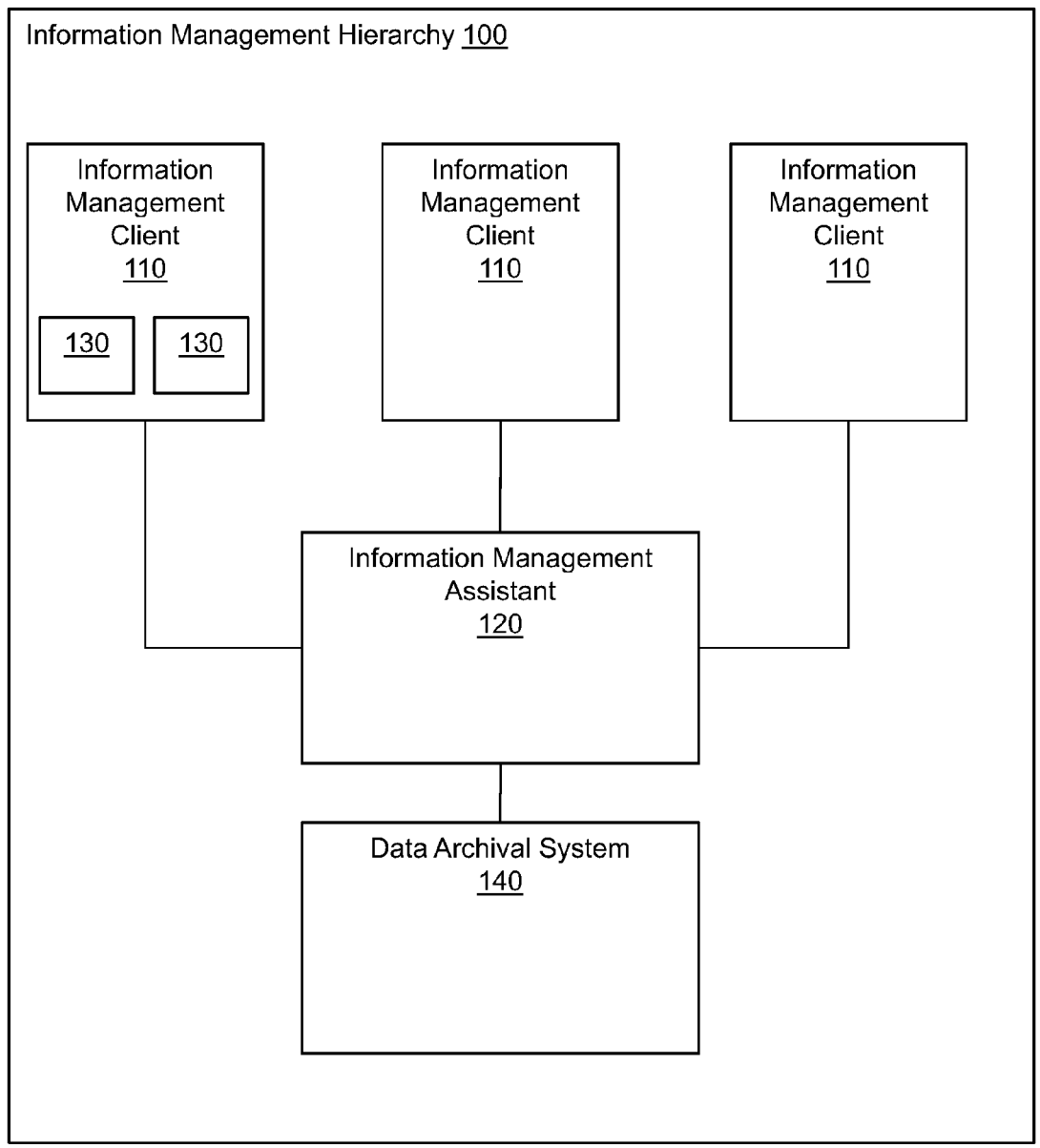
FIG. 1 illustrates an example embodiment of an information management hierarchy.

FIG. 1 depicts one embodiment of an information management hierarchy 100 for an organization. The information management hierarchy 100 includes information management clients (IM clients) 110. The IM clients 110 represent various systems that the organization integrates to perform information management tasks. Examples of information management clients may include servers that send and receive e-mail for the organization, relational databases that store organization-critical data (e.g., accounting information, human resources data), and web servers that host websites for the organization and record information related to visits to the organization's websites. In the example information management hierarchy 100, information management tasks are managed by the information management assistant (IM Assistant) 120.

The IM Assistant 120 may discover new or updated IM clients within the hierarchy 100. For example, the IM Assistant 120 may scan servers within the organization periodically to determine whether a new server has been installed. One method for determining whether there is a new IM client is for the IM assistant 120 to determine if a server is listening on a particular port. For example, a particular vendor's database servers may usually be configured to listen for database requests on a particular port. Thus, if the IM Assistant 120 discovers that a newly-added server is listening on a port that is typically used for the database requests by the particular vendor's databases, the IM Assistant 120 may determine that the new server is one of that particular vendor's database servers. The IM Assistant 120 may further be configured to integrate new database servers into the organization's existing information management hierarchy as the new servers are added within the organization. For example, an organization may add a customer relationship management (CRM) system in its sales department. If the IM Assistant 120 discovers a new IM client, the IM Assistant 120 may catalog information about the new server. Further, if the IM Assistant 120 has the proper credentials, it may initiate the installation of a software agent on the new server. In the example of the CRM system, the agent installed by the IM assistant 120 would be capable of reading data stored in that particular CRM system. Installing a software agent on the new server would enable the IM Assistant 120 to add the new server into the organization's existing information management hierarchy.

Once a new IM client is added to the information management hierarchy 100, the IM Assistant 120 can take additional actions to integrate the new IM client within the information management hierarchy 100. The IM assistant 120 may identify one or more information management entities (IM entities) 130 associated with the new IM client. For example, a single database server might be used to host multiple databases. A smaller organization might use a single database server configuration as a cost-saving measure, for example. If a single database server is used to host multiple databases, then the database server could be considered a single IM client. The single IM client thus would be associated with multiple IM entities. Furthermore, a single server may be responsible for applications, databases, file systems, and so on of different types (e.g., a web server and a database server). Thus, a single IM client may provide IM entities of different types. The IM assistant 120 may coordinate different information management activities for each IM entity, even if there is only a single IM client.

The IM Assistant 120 may instruct the various elements of the information management hierarchy 100. By instructing the elements of the information management hierarchy 100, the IM assistant 120 can meet the organization's information management objectives with respect to the IM entities within the information management hierarchy 100. The IM assistant 120 also may coordinate activities of the various elements to meet the objectives for a newly-added IM entity. Instructions from the IM Assistant 120 may include controlling a data archival system 140 to periodically archive the data from the new IM entity. Further, the frequency with which the data from the new IM entity is archived may vary depending on the type of data stored by the new IM entity. For example, the organization may consider sales and accounting data more critical than human resources data, even if both types of data are stored by the same type of IM entity (e.g., a relational database). Thus, the organization's information management objectives may specify that sales and accounting data are to be archived daily, while human resources data are to be archived twice weekly. The IM Assistant 120 can monitor information management tasks to determine whether the organization's information management objectives are being met.

Figure 2:
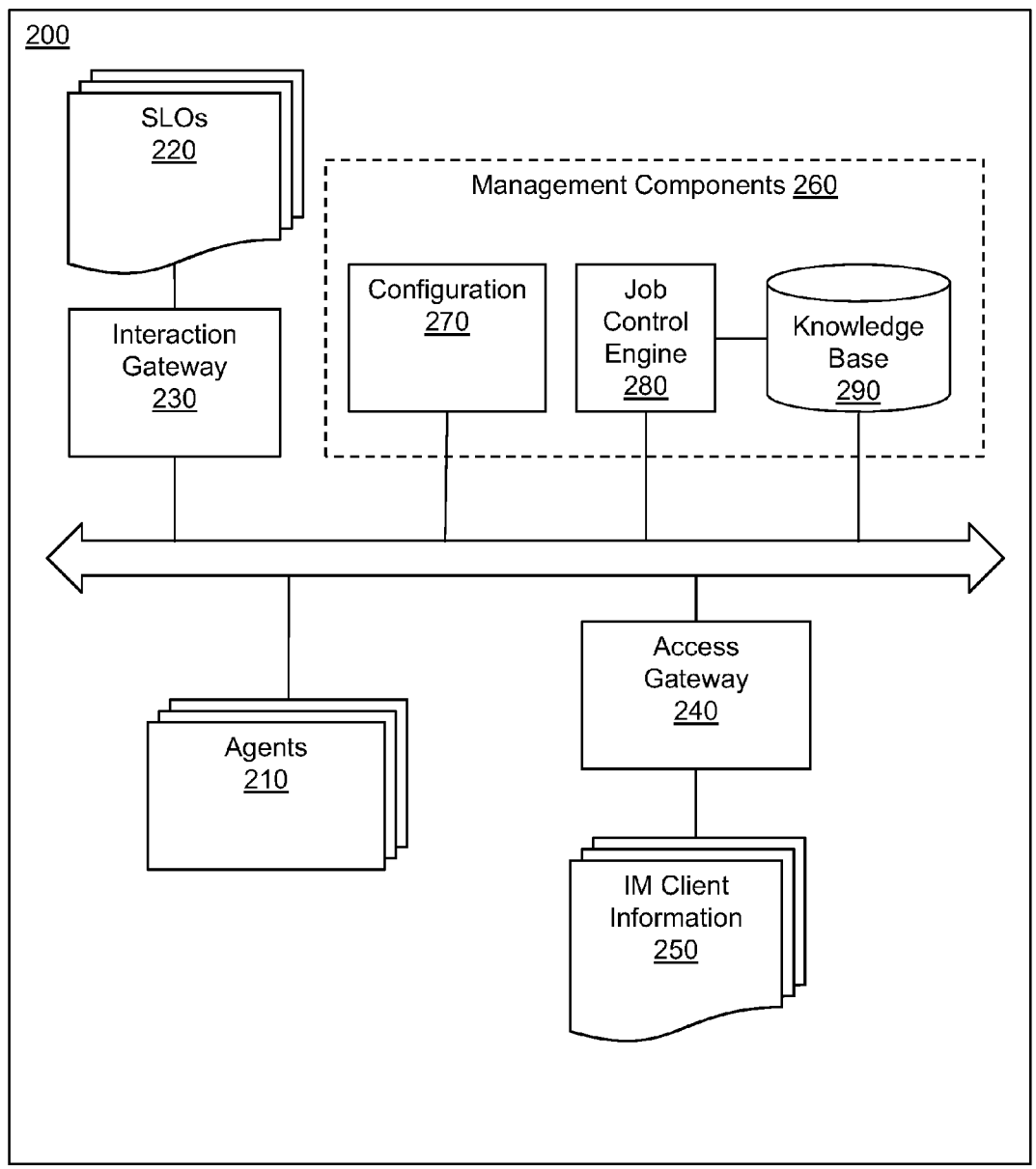
FIG. 2 illustrates an example embodiment of an information management assistant.

FIG. 2 illustrates one embodiment of an information management assistant (IM assistant) 200. Agents 210 are processes that execute on the IM clients within the information management hierarchy. The IM Assistant 200 coordinates the activities of the agents 210 to assess whether the organization's information management objectives are being met. Service level objectives (SLOs) 220 define quantifiable parameters set by a systems administrator to govern moving and managing data within the organization's information management hierarchy. Interaction gateway 230 and access gateway 240 are interfaces through which information is provided to the IM assistant 200. Information from the SLOs 220 is provided to the IM assistant 200 through interaction gateway 230. The information from the SLOs 220 permits the IM assistant 200 to perform information management activities that satisfy the parameters set by the systems administrator. The access gateway 240 is an interface through which IM client information 250 is provided to the IM assistant 200. The IM client information 250 may be a data store that contains information about IM clients integrated into the organization's information management hierarchy. The information stored about IM clients could include server names, addresses, or other information allowing the IM assistant 200 to identify a particular IM client within the information management hierarchy. The IM assistant 200 also may discover IM clients for which no information is stored in IM client information 250.

The management components 260 convert information about the information management hierarchy into actions to accomplish the organization's objectives. The configuration component 270 understands the applications that are to be managed on the IM clients. Thus, the configuration component 270 installs appropriate agents 210 on the IM clients. In addition, the configuration component 270 discovers IM entities associated with the IM clients. The discovered IM entities constitute a protection domain. Job control engine 280 generates data movement plans that are designed to satisfy the SLOs 220 defined by the systems administrator. The job control engine 280 dispatches and executes jobs indicated by the data movement plans. The job control engine 280 is also responsible for monitoring execution of jobs over time. Jobs are monitored over time to determine how effectively the executed jobs meet the requirements set forth in the SLOs 220. Information derived from monitoring job execution may be stored in knowledge base 290. If the job control engine 280 determines that executed jobs have not met the requirements set forth in the SLOs 220, then the job control engine 280 may modify the existing data movement plans for future runs. The job control engine 280 may use the information stored in knowledge base 290 to modify the data movement plans. By modifying the existing data movement plans, the results of future runs may better satisfy the requirements of the SLOs 220.

Figure 3:
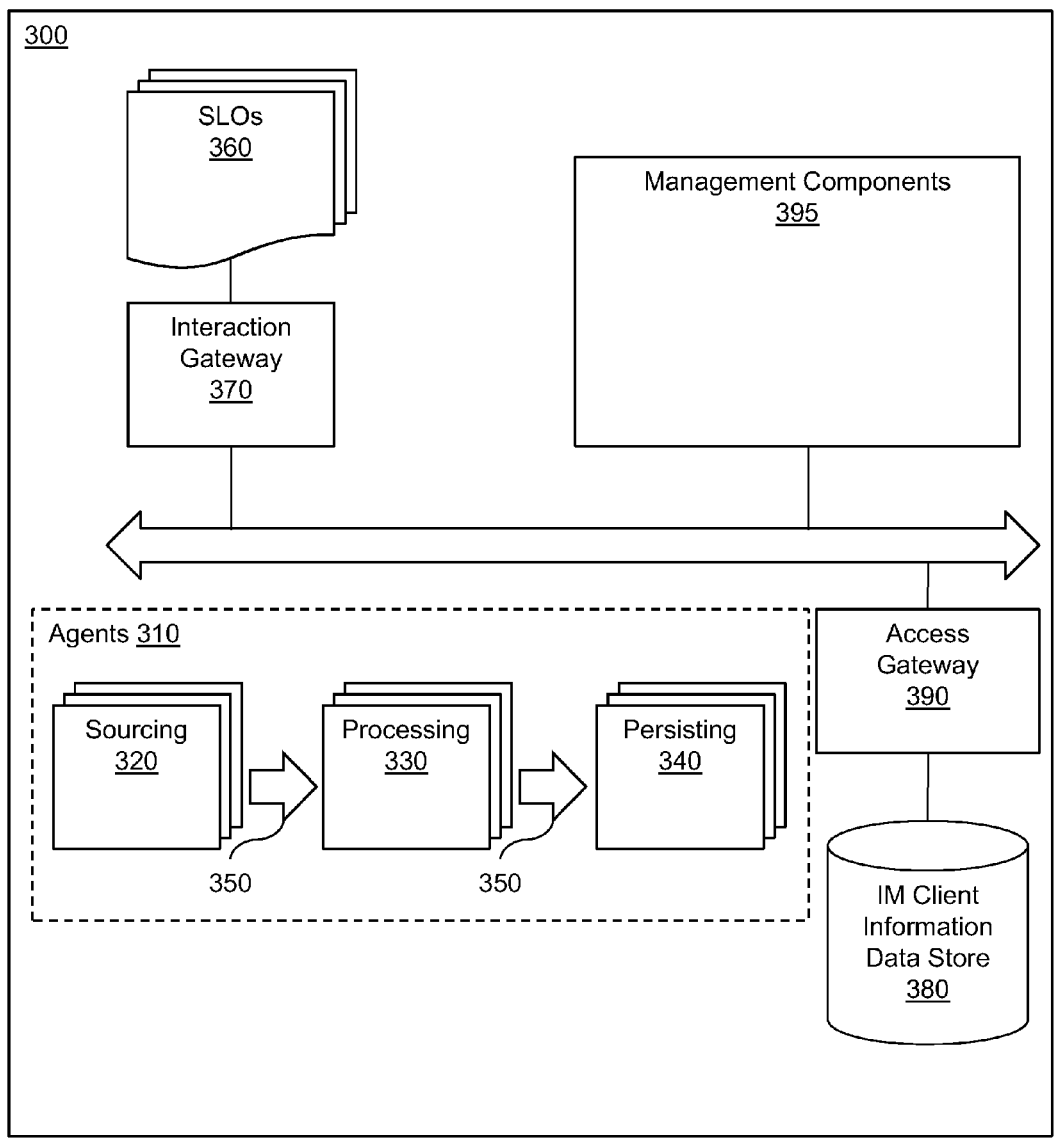
FIG. 3 illustrates another embodiment of an information management assistant.

FIG. 3 illustrates another embodiment of an IM assistant 300. Agents 310 are processes that execute on the IM clients within the information management hierarchy. Sourcing agents 320 execute on IM clients that function as sources of information within the information management hierarchy. Examples of IM clients that may function as sources of information include databases storing information resulting from the organization's operations, mail servers that send, receive, and store e-mail, and individuals' computers within the organization. Processing agents 330 execute on IM clients that process information within the information management hierarchy. Information processing within the information management hierarchy could include, for example, compressing data or encrypting data. Persisting agents 340 execute on IM clients that function as data stores within the information management hierarchy. For example, an organization may have one or more centralized data archival sites where data is persisted. An organization could have one centralized data archival site at the organization's location and another data archival site at a location geographically removed from the organization's location. Archiving data at two sites geographically removed from each other could reduce the potential data losses that would result from a catastrophic failure, natural disaster, or sabotage at one of the sites.

Data transfer bus 350 permits the various agents employed by the IM assistant 300 to transfer data among themselves. The data transfer bus 350 may be a general-purpose data transfer mechanism. Alternately, the data transfer bus 350 could be an intelligent data transfer mechanism (e.g., a unified information management bus).

The IM assistant 300 coordinates the activities of the agents 310 to meet the organization's information management objectives. A systems administrator may define quantifiable parameters in SLOs 360. Information from the SLOs 360 guides the IM assistant 300 in attempting to meet the organization's information management objectives. Information from the SLOs 360 is provided to the IM assistant 300 via interaction gateway 370. Information regarding IM clients within the organization may be stored in IM client information data store 380. Information from the data store 380 is provided to the IM assistant 300 through access gateway 390. Management components 395 use information from the SLOs 360 and the data store 380 to deploy agents on IM clients within the information management hierarchy. The management components 395 also use the information to coordinate the activities of deployed agents to meet the organization's information management objectives.

Some portions of the detailed descriptions below are presented in terms of algorithms and symbolic representations of operations on data bits within a memory. These algorithmic descriptions and representations are used by those skilled in the art to convey the substance of their work to others. An algorithm, here and generally, is conceived to be a sequence of operations that produce a result. The operations may include physical manipulations of physical quantities. Usually, though not necessarily, the physical quantities take the form of electrical or magnetic signals capable of being stored, transferred, combined, compared, and otherwise manipulated in a logic, and so on. The physical manipulations create a concrete, tangible, useful, real-world result.

Example methods may be better appreciated with reference to flow diagrams. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional, not illustrated blocks.

Figure 4:
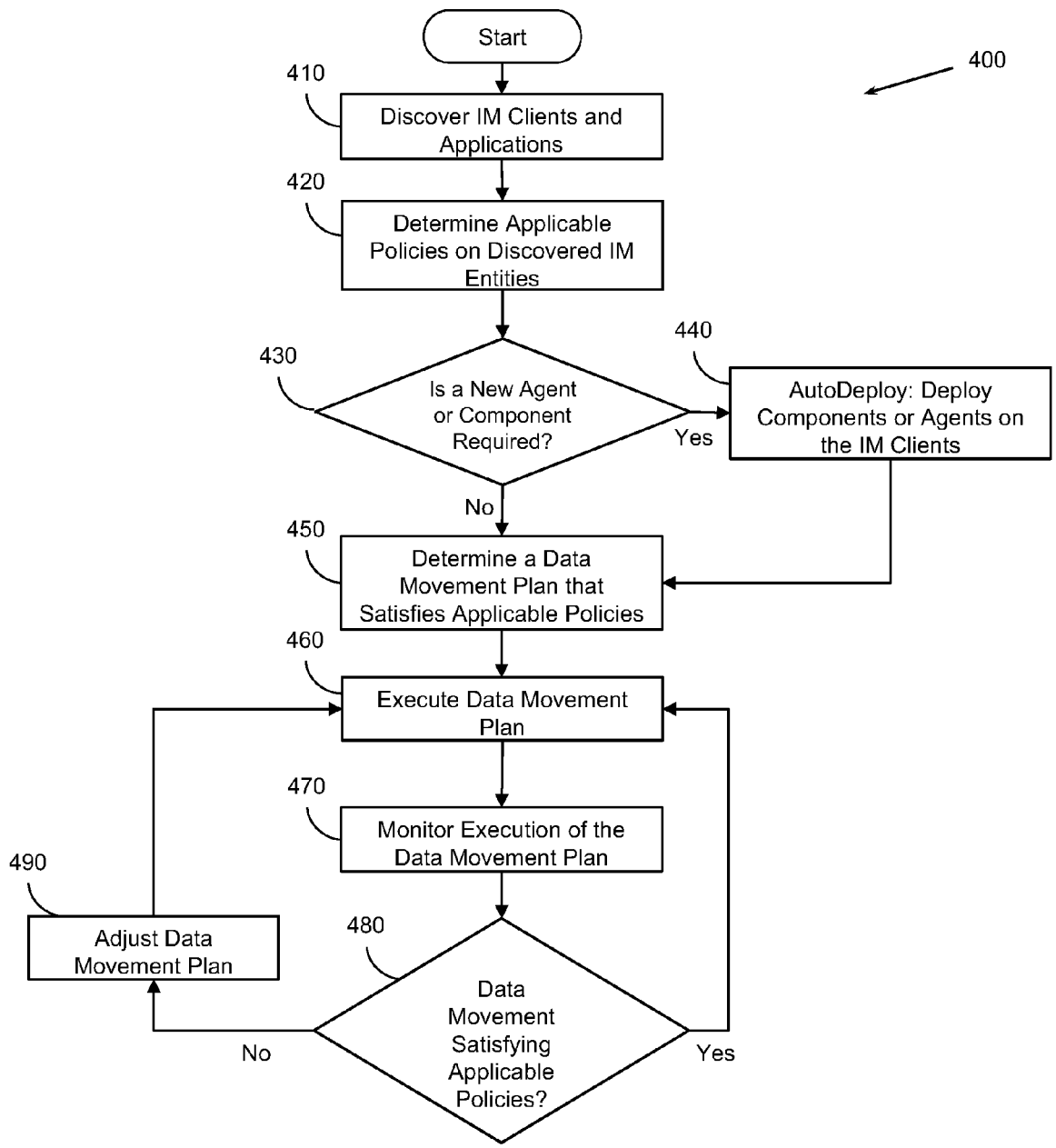
FIG. 4 illustrates one embodiment of a flowchart depicting an example method for information management automation.

FIG. 4 depicts one embodiment of a method 400 for information management automation. Method 400 may include, at 410, discovering information management clients (IM clients) and applications. Discovering IM clients and applications can involve scanning systems within an organization to determine whether the systems are hosting information that the organization wishes to incorporate into its information management hierarchy. Alternatively, IM clients may be discovered by scanning a database that contains information describing an IM client. Systems may be scanned to determine if they are listening on particular ports, if particular registry entries are present, or if a particular user account has been created. Different applications may leave different indicators of their presence on systems. The greater the number of indicators that can be scanned, the more likely it is that the method will identify the greatest number of IM clients and applications. Further, it is not always necessary for IM clients to be discovered. For example, an IM client may already be known, but there may be one or more new information management entities (IM entities) associated with the known IM client. An example of a known IM client associated with a new IM entity could be an e-mail server. The mailboxes hosted by the e-mail server may be treated as separate IM entities. Treating mailboxes as separate IM entities permits an additional level of granularity in information management. Thus, if an organization believes that one user's e-mail is more valuable than another user's, the organization could associate different information management objectives with different users' mailboxes. In the case of a known IM client associated with a new IM entity, the discovery at 410 may involve discovery of the new IM entity, rather than discovery of an IM client.

At 420, the method 400 may include determining applicable policies on discovered IM entities. Determining applicable policies on discovered IM entities may involve analyzing information about an organization's information management objectives. Information about the organization's information management objectives may be analyzed to determine whether a discovered IM entity is impacted by one or more of the objectives. If a discovered IM entity is impacted by one or more of an organization's objectives, then the applicable objectives may cause various actions to be undertaken with respect to the discovered IM entity. One example action is depicted at 430, where the method 400 determines whether a new agent or component is to be deployed. If the method 400 determines that a new agent or component is to be deployed for a discovered IM entity, then at 440, the method 400 may automatically deploy the new agents or components. New agents or components generally may be deployed on IM clients associated with discovered IM entities. For example, if an IM client were an e-mail server, a discovered IM entity could be a newly-created mailbox on the e-mail server. If an appropriate agent previously had been installed on the e-mail server, there may not be a need to deploy an agent on the IM client to enable integration of the discovered IM entity.

At 450, the method 400 determines a data movement plan that satisfies the organization's applicable policies. Determining a data movement plan may include selecting the tasks that are undertaken to accomplish the organization's information management objectives. The data movement plan also may define a schedule on which the selected tasks are executed. For example, the organization may assign a high value to its accounting data. The data movement plan for the IM entity responsible for storing the organization's accounting data could include the task of archiving the accounting data. Due to the high value placed on the accounting data, the schedule for archival of the accounting data may be frequent (e.g., once per day). If the same organization determines that e-mail data of individual users within the organization has a low value, e-mail data may still be archived, but the e-mail data archival could be less frequent than accounting data archival. The method 400 takes into account the applicable policies of the organization when determining a data movement plan for a discovered IM entity, even those policies directed at other IM entities. Thus, if archival resources for the organization are limited, it is possible that only the data most valued by the organization would be archived frequently, while other types of data would be archived less often. Flexible scheduling of information management tasks could help avoid having the data movement plan overwhelm the limited archival resources available.

Once a data movement plan is determined, the method 400 executes the data movement plan, as depicted at 460. Execution of the data movement plan need not involve immediate actions (e.g., commencing archival of data). The executed data movement plan may specify that the first action does not take place for some period of time, whether a few hours, a few days, or some other period. Thus, even though the data movement plan is being executed, there may be no activity immediately associated with its execution. At 470, the method 400 monitors execution of the data movement plan. The method 400 is responsible for determining whether the organization's policies are being met. Assessing whether the execution of the data movement plan accomplishes those objectives permits the method 400 to determine whether the policies are being satisfied, as shown at 480. If execution of the data movement plan satisfies the organization's policies, then the method 400 returns to executing the data movement plan at 460. If execution of the data movement plan does not satisfy the organization's policies, the method 400 adjusts the data movement plan, as shown at 490. Adjustments to the data movement plan could include changing various aspects of the data movement plan. Examples of aspects of a data movement plan that could be changed include changing what tasks are executed, changing the order of task execution, changing the timing of task execution, and changing which information management resources are used within the data movement plan (e.g., using a different archival resource if more than one is available). Once the method 400 has made adjustments to the data movement plan, the method 400 returns to executing the adjusted data movement plan at 460.

In some examples, "database" is used to refer to a table. In other examples, "database" may be used to refer to a set of tables. In still other examples, "database" may refer to a set of data stores and methods for accessing and/or manipulating those data stores.

"User", as used herein, includes but is not limited to one or more persons, software, computers or other devices, or combinations of these.

"Data store", as used herein, refers to a physical and/or logical entity that can store data. A data store may be, for example, a database, a table, a file, a list, a queue, a heap, a memory, a register, and so on. In different examples, a data store may reside in one logical and/or physical entity and/or may be distributed between two or more logical and/or physical entities.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the invention is not limited to the specific details, the representative apparatus, and illustrative examples shown and described. Thus, this application is intended to embrace alterations, modifications, and variations that fall within the scope of the appended claims.

To the extent that the term "includes" or "including" is employed in the detailed description or the claims, it is intended to be inclusive in a manner similar to the term "comprising" as that term is interpreted when employed as a transitional word in a claim.

To the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

To the extent that the phrase "one or more of, A, B, and C" is employed herein, (e.g., a data store configured to store one or more of, A, B, and C) it is intended to convey the set of possibilities A, B, C, AB, AC, BC, and/or ABC (e.g., the data store may store only A, only B, only C, A&B, A&C, B&C, and/or A&B&C). It is not intended to require one of A, one of B, and one of C. When the applicants intend to indicate "at least one of A, at least one of B, and at least one of C", then the phrasing "at least one of A, at least one of B, and at least one of C" will be employed.

What is claimed is:

1. A method, comprising:
   discovering, by an information management (IM) assistant implemented in a computer, multiple disparate IM clients, wherein the IM assistant is separate from the IM clients;
   discovering, by the IM assistant, a plurality of IM entities provided by a given IM client of the IM clients;
   in response to discovering the plurality of IM entities, determining, by the IM assistant whether an agent is to be deployed for a first of the plurality of IM entities;
   in response to determining that the agent is to be deployed for the first IM entity, deploying the agent at the given IM client;
   determining, by the IM assistant, a data movement plan that indicates how data should move between the multiple IM clients;
   coordinating, by the IM assistant, activities of agents of the multiple IM clients to execute the data movement plan; and
   storing, in a knowledge base of the IM assistant, information derived from monitoring execution of the data movement plan.

2. The method of claim 1, where the agents of the multiple IM clients are each configured to at least one of provide data, process data and store data.

3. The method of claim 1, comprising:
   automatically altering the data movement plan based on the stored information derived from monitoring the execution of the data movement plan.

4. The method of claim 3, where the data movement plan is determined based on service level objectives specified by an administrator.

5. The method of claim 3, where the data movement plan specifies movement of data over a unified information management bus.

6. The method of claim 1, where executing the data movement plan includes at least one of the IM clients outputting stored data and at least one of the IM clients receiving and storing the output data.

7. The method of claim 1, wherein discovering the multiple disparate IM clients comprises discovering IM clients including an email server, a database server, and a web server.

8. The method of claim 1, wherein discovering the multiple disparate IM clients comprises listening on a port and detecting creation of a user account.

9. The method of claim 8, wherein discovering the multiple disparate IM clients further comprises checking entries of a registry.

10. The method of claim 1, wherein determining that the agent is to be deployed for the first IM entity is in response to identifying an information management objective that impacts the first IM entity.

11. The method of claim 1, further comprising:
    determining, by the IM assistant, whether a second agent is to be deployed at the given IM client for a second of the IM entities; and
    in response to determining that the second agent is not to be deployed at the given IM client for the second IM entity, deciding, by the IM assistant, to not deploy the second agent at the given IM client.

12. The method of claim 1, further comprising:
    determining, by the IM assistant, whether a second agent is to be deployed at a second IM client of the IM clients for an IM entity of the second IM client; and
    in response to determining that the second agent is not to be deployed at the second IM client for the IM entity at the second IM client, deciding, by the IM assistant, to not deploy the second agent at the second IM client.

13. The method of claim 1, wherein the given IM client is a mail server, and the plurality of IM entities include a plurality of mailboxes of the mail server.

14. A system, comprising:
multiple disparate information management (IM) clients, each including a hardware processor;
an IM assistant that is separate from the IM clients and that includes a hardware processor to:
  discover the multiple IM clients;
  discover a plurality of IM entities provided by a given IM client of the multiple IM clients;
  in response to discovering the plurality of IM entities, determine whether an agent is to be deployed for a first of the plurality of IM entities;
  in response to determining that the agent is to be deployed for the first IM entity, deploy the agent at the given IM client;
  determine a data movement plan for the first IM entity that indicates how data should move between the multiple IM clients;
  coordinate activities of agents of the multiple IM clients to execute the data movement plan; and
  store, in a knowledge base of the IM assistant, information derived from monitoring execution of the data movement plan.

15. The system of claim 14, where the IM assistant is to alter the data movement plan based on the stored information derived from monitoring the execution of the data movement plan.

16. The system of claim 15, where the data movement plan is defined based on service level objectives.

17. The system of claim 14, wherein the data movement plan for the first IM entity specifies archiving according to a first frequency of data of the first IM entity, wherein the IM assistant is to further:
  determine a second data movement plan for a second of the plurality of IM entities provided by the given IM client, wherein the second data movement plan specifies archiving according to a second, different frequency of data of the second IM entity.

18. The system of claim 14, wherein the IM clients comprise an email server, a database server, and a web server.

19. A non-transitory computer-readable storage medium that stores computer-executable instructions that when executed cause an information management (IM) assistant including a computer to:
  discover multiple disparate IM clients, wherein the IM assistant is separate from the IM clients;
  discover a plurality of IM entities provided by a given IM client of the IM clients;
  in response to discovering the plurality of IM entities, determine whether an agent is to be deployed for a first of the plurality of IM entities;
  in response to determining that the agent is to be deployed for the first IM entity, deploy the agent at the given IM client;
  determine a data movement plan that indicates how data should move between the multiple IM clients;
  coordinate activities of agents of the multiple IM clients to execute the data movement plan; and
  store, in a knowledge base of the IM assistant, information derived from monitoring execution of the data movement plan.

20. The computer-readable storage medium of claim 19, wherein the computer-executable instructions when executed cause the IM assistant to further:
  alter the data movement plan based on the stored information derived from monitoring the execution of the data movement plan.

21. The computer-readable storage medium of claim 19, wherein the computer-executable instructions when executed cause the IM assistant to further:
  alter the data movement plan based on a failure of a portion of the data movement plan.

22. The computer-readable storage medium of claim 19, wherein the data movement plan is determined by the IM assistant for the first IM entity, the data movement plan specifying archiving according to a first frequency of data of the first IM entity, and wherein the computer-executable instructions when executed cause the IM assistant to further:
  determine a second data movement plan for a second of the plurality of IM entities provided by the given IM client, wherein the second data movement plan specifies archiving according to a second, different frequency of data of the second IM entity.

* * * * *